US012148180B2

(12) United States Patent
Miller

(10) Patent No.: US 12,148,180 B2
(45) Date of Patent: Nov. 19, 2024

(54) IMAGE PROCESSING TECHNIQUES FOR IDENTIFYING LOCATION OF INTEREST

(71) Applicant: Omnitracs, LLC, Dallas, TX (US)

(72) Inventor: Ryan Leonard Miller, Chicago, IL (US)

(73) Assignee: OMNITRACS, LLC, Dallas, TX (US)

(*) Notice: Subject to any disclaimer, the term of this patent is extended or adjusted under 35 U.S.C. 154(b) by 106 days.

(21) Appl. No.: 17/169,431

(22) Filed: Feb. 6, 2021

(65) Prior Publication Data

US 2021/0248776 A1 Aug. 12, 2021

Related U.S. Application Data

(60) Provisional application No. 62/971,618, filed on Feb. 7, 2020.

(51) Int. Cl.
*G06T 7/73* (2017.01)
*G01S 19/51* (2010.01)
(Continued)

(52) U.S. Cl.
CPC ............ *G06T 7/73* (2017.01); *G01S 19/51* (2013.01); *G06T 7/13* (2017.01); *G06T 7/194* (2017.01)

(58) Field of Classification Search
CPC ... G06T 7/73; G06T 7/13; G06T 7/194; G01S 19/51; G01S 19/14; H04W 4/021
See application file for complete search history.

(56) References Cited

U.S. PATENT DOCUMENTS

| 2008/0157990 | A1* | 7/2008 | Belzer | G06Q 10/087 340/678 |
| 2014/0236723 | A1* | 8/2014 | Abhyanker | G06Q 50/01 705/14.57 |

(Continued)

FOREIGN PATENT DOCUMENTS

| CN | 104718769 A | * | 6/2015 | ............. H04W 4/02 |
| DK | 201770238 A1 | * | 12/2018 | |
| KR | 101599990 B1 | * | 3/2016 | ............. G06Q 50/16 |

OTHER PUBLICATIONS

"Geofence" definition from Collins English Dictionary, accessed Dec. 5, 2023. (Year: 2023).*

(Continued)

*Primary Examiner* — Aaron W Carter
*Assistant Examiner* — Kathleen M Broughton
(74) *Attorney, Agent, or Firm* — ArentFox Schiff LLP

(57) ABSTRACT

Aspects of the present disclosure provide image processing techniques to analyze the geospatial image of a geographic area in order to identify locations of interest within the geospatial image for different applications. Specifically, techniques of the present disclosure may identify the geographic coordinate information associated with a street address of a physical structure and retrieve the geospatial image of the geographic area including the physical structure based on the geographic coordinate information. The image processor may then generate a virtual geofence around the physical structure that then allows a network computer to receive and analyze GPS information received from a plurality of devices located within the virtual geofence over a period of time in order to generate locations of interest information for different applications.

23 Claims, 11 Drawing Sheets

(51) Int. Cl.
G06T 7/13 (2017.01)
G06T 7/194 (2017.01)

(56) References Cited

U.S. PATENT DOCUMENTS

| | | | | |
|---|---|---|---|---|
| 2014/0258201 | A1* | 9/2014 | Finlow-Bates | G01S 19/42 |
| | | | | 706/46 |
| 2015/0095355 | A1* | 4/2015 | Patton | H04W 4/021 |
| | | | | 707/754 |
| 2015/0230054 | A1* | 8/2015 | Myllymaki | H04W 64/006 |
| | | | | 455/457 |
| 2015/0281886 | A1* | 10/2015 | Steiner | H04W 4/021 |
| | | | | 455/456.1 |
| 2016/0034712 | A1* | 2/2016 | Patton | G06Q 50/01 |
| | | | | 726/28 |
| 2017/0236024 | A1* | 8/2017 | Wang | G06V 10/56 |
| | | | | 382/201 |
| 2017/0345017 | A1* | 11/2017 | Koger | G06Q 30/018 |
| 2018/0204469 | A1* | 7/2018 | Moster | G08G 5/0069 |
| 2018/0322197 | A1* | 11/2018 | Hesterman | G06F 16/75 |
| 2019/0188337 | A1* | 6/2019 | Keane | G06Q 50/16 |
| 2019/0188602 | A1* | 6/2019 | Kwant | G06N 3/08 |
| 2019/0311596 | A1* | 10/2019 | Valentino | H04W 4/021 |
| 2019/0347745 | A1* | 11/2019 | Bones | G06Q 50/02 |
| 2020/0015034 | A1* | 1/2020 | Ahn | H04W 64/003 |
| 2020/0107150 | A1* | 4/2020 | Jensen | H04W 4/44 |
| 2020/0209343 | A1* | 7/2020 | Connors | H04W 4/80 |

OTHER PUBLICATIONS

Alahakone et al, Geospatial Information System for Tracking and Navigation of Mobile Objects, 2009 IEEE ASME International Conference on Advanced Intelligent Mechatronics, Suntec Convention and Exhibition Center, pp. 1-6. (Year: 2009).*

* cited by examiner

| | ADDRESS_1 | CITY_STATE_ZIP |
|---|---|---|
| 0 | 3007 Stephens Blvd | Joplin MO 64804-3368 |
| 1 | 17 Cermak Blvd | Saint Peters MO 63376-1019 |
| 2 | 231 Executive Dr | Newark DE 19702-3324 |
| 3 | 880 Burnett Rd | Chicopee MA 01020-2769 |
| 4 | 6450 Bristol Pike | Levittown PA 19057-4916 |

*FIG. 2A*

475 → ed based on an offset value. The method may also include generating a virtual geofence around the physical structure corresponding to the second boundary outline, and storing, in a memory, geofence information for the physical structure based on the virtual geofence corresponding to the second boundary outline.

IMAGE PROCESSING TECHNIQUES FOR IDENTIFYING LOCATION OF INTEREST

CROSS-REFERENCE TO RELATED APPLICATION(S)

The application claims benefit of U.S. Provisional Application Ser. No. 62/971,618, entitled "IMAGE PROCESSING TECHNIQUES FOR IDENTIFYING LOCATION OF INTEREST," and filed Feb. 7, 2020, which is expressly incorporated by reference herein in its entirety.

BACKGROUND

Aspects of the present disclosure generally relate to image processing, and more particularly to image processing for identifying locations of interest.

Until the $18^{th}$ and $19^{th}$ centuries, most houses and buildings were not numbered. Street naming and numbering began under the age of enlightenment. Numbering allowed people to efficiently receive mail, as the postal system evolved to reach widespread usage. Today, the same postal system of associating locations with unique street addresses of where the person(s) at that address may receive mail continues. This typically correlates to a mail box on the public street closest to a facility (e.g., home, business, or plot of land).

However, identifying a location based simply by the street address may not be ideal or precise for various logistics applications. For example, a location of interest (or "point-of-interest") at a large retail store with significant footprint and multiple entry and exit points may vary for different users and applications. Customer parking, for instance, may be located at the front of the retail store, while the location for deliveries may be located at a completely different part of the facility. Yet, the "street address" for the retail store may not be close to either location if the store is situated in a large multistore complex far from the main street.

Thus, there is a need for improved location identification system that correlates the street address with locations of interest at a facility.

SUMMARY

Aspects of the present disclosure solve the above-identified problem by implementing image processing techniques to analyze the geospatial image of a geographic area in order to identify locations of interest within the geospatial image for different applications. Specifically, techniques of the present disclosure may identify the geographic coordinate information associated with a street address of a physical structure and retrieve the geospatial image of the geographic area including the physical structure based on the geographic coordinate information. The image processor may then generate a virtual geofence around the physical structure that then allows a network computer to receive and analyze global positioning system (GPS) information received from a plurality of devices located within the virtual geofence over a period of time in order to generate locations of interest information for different applications.

In one example, a method for image processing is described. In some aspects, the method may include receiving, at the computer, geographic coordinate information associated with a street address of a physical structure. The method may further include retrieving, from a database, a geospatial image of a geographic area including the physical structure based on the geographic coordinate information. The method may additionally include processing, by an image processor, the geospatial image to extract a first boundary outline of the physical structure. The method may further include calculating a second boundary outline offset outside of the first boundary line based on an offset value. The method may also include generating a virtual geofence around the physical structure corresponding to the second boundary outline, and storing, in a memory, geofence information for the physical structure based on the virtual geofence corresponding to the second boundary outline.

In another example, an apparatus for image processing is disclosed. The apparatus may include a memory configured to store instructions, and a processor communicatively coupled with the memory. The processor may be configured to be execute the instructions to receive, at the computer, geographic coordinate information associated with a street address of a physical structure. The apparatus may further include instructions to retrieve, from a database, a geospatial image of a geographic area including the physical structure based on the geographic coordinate information. The apparatus may further include instructions to process, by an image processor, the geospatial image to extract a first boundary outline of the physical structure. The apparatus may further include instructions to calculate a second boundary outline offset outside of the first boundary line based on an offset value. The apparatus may further include instructions to generate a virtual geofence around the physical structure corresponding to the second boundary outline, and store, in a memory, geofence information for the physical structure based on the virtual geofence corresponding to the second boundary outline.

In another example, a non-transitory computer readable medium storing instructions, executable by a processor of a computer device are disclosed. The computer readable medium may include instructions for receiving, at the computer, geographic coordinate information associated with a street address of a physical structure. The computer readable medium may further include instructions for retrieving, from a database, a geospatial image of a geographic area including the physical structure based on the geographic coordinate information. The computer readable medium may further include instructions for processing, by an image processor, the geospatial image to extract a first boundary outline of the physical structure. The computer readable medium may further include instructions for calculating a second boundary outline offset outside of the first boundary line based on an offset value. The computer readable medium may further include instructions for generating a virtual geofence around the physical structure corresponding to the second boundary outline, and storing, in a memory, geofence information for the physical structure based on the virtual geofence corresponding to the second boundary outline.

The above presents a simplified summary of one or more aspects of the present disclosure in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the present disclosure in a simplified form as a prelude to the more detailed description that is presented later.

To the accomplishment of the foregoing and related ends, the one or more aspects of the present disclosure comprise the features hereinafter fully described and particularly pointed out in the claims. The following description and the annexed drawings set forth in detail certain illustrative features of the one or more aspects of the present disclosure. These features are indicative, however, of but a few of the various ways in which the principles of various aspects of the present disclosure may be employed, and this description is intended to include all such aspects and their equivalents.

BRIEF DESCRIPTION OF THE DRAWINGS

The disclosed aspects of the present disclosure will hereinafter be described in conjunction with the appended drawings, provided to illustrate and not to limit the disclosed aspects, wherein like designations denote like elements, where a dashed line may indicate an optional element or action, and in which:

FIGS. 2A and 2B are examples of data extraction and processing that associates street address data to the geographic coordinate information and allows for retrieval of a geospatial image corresponding to the geographic coordinate information in accordance with various aspects of the present disclosure;

DETAILED DESCRIPTION

As noted above, identifying a location based simply by the street address may not be ideal or precise for various logistics applications. To this end, aspects of the present disclosure provide image processing techniques to analyze the geospatial image of a geographic area in order to identify locations of interest within the geospatial image for different applications. Specifically, techniques of the present disclosure may identify the geographic coordinate information associated with a street address of a physical structure and retrieve the geospatial image of the geographic area including the physical structure based on the geographic coordinate information. The image processor may then generate a virtual geofence around the physical structure that then allows a network computer to receive and analyze GPS information received from a plurality of devices located within the virtual geofence over a period of time in order to generate locations of interest information for different applications.

Various aspects are now described in more detail with reference to the FIGS. 1-6. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples of implementations of the described system based on the principles described herein, but it should be understood that these examples are not intended to limit the scope of the claims. For instance, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined with other features described in other examples.

Figure 1:
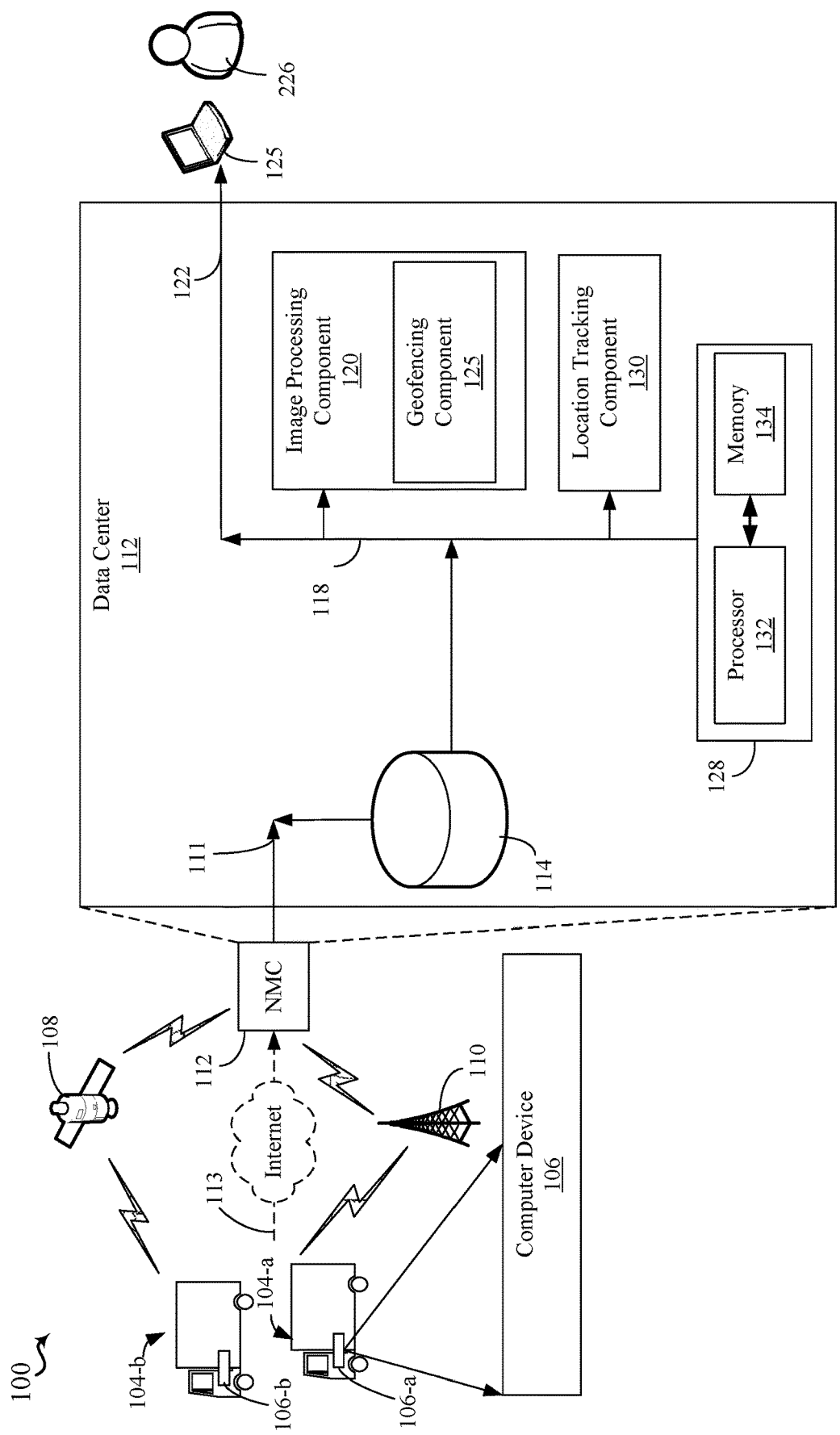
FIG. 1 is a functional block diagram of example elements of a system in accordance with various aspects of the present disclosure.

Referring to FIG. 1, in an aspect, a system 100 includes one or more computer devices, modules, and/or components for controlling vehicles for platooning. As used herein, the terms "module(s)," or "components" may be one of the parts that make up a device, may be hardware or software or firmware, and may be divided into other modules and/or distributed across one or more processors.

In an aspect, system 100 can comprise a network-based control computer (NCC) 112, such as at a network management center, configured to communicate with one or more vehicles 104 via a computer device 106 (e.g., ELD and/or mobile device, etc.) located on each tractor 104 or associated with each driver of each tractor 104. In some systems, the computer device 106 may be more than one device, such as an ELD that may communicate with the mobile device (e.g., a smart phone or an in-cab telematics device). The system 100 may include one or more fleets of vehicles 104. Typically, a fleet could include many tens, hundreds or thousands of vehicles. An example fleet is illustrated as having two vehicles 104. Each computer device 106 may include ELD functionality configured to collect and transmit data associated with the driver to the NCC 112. Also, in some implementations, each computer device 106 and/or its ELD functionality can be configured to perform calculations associated with one or more fleet vehicles using any of the collected data. In some examples, the collected data may include the driver or vehicle data, such as but not limited to one or more of a vehicle identification, a driver identification, the HOS information for the driver, a location of the vehicle 104, and/or telematics information associated with the vehicle 104 and/or driver, which will be collectively referred to as "vehicle information 109." In some examples, telematics is an interdisciplinary field that encompasses telecommunications, vehicular technologies, for instance, road transportation, road safety, electrical engineering (sensors, instrumentation, wireless communications, etc.), and computer science (multimedia, Internet, etc.). To this end, the telematics technology may include transmitting, receiving and storing information (e.g., vehicle and/or driver information) using telecommunication devices to control remote objects such as control one or more applications and aspects of the vehicles (e.g., control the braking and engine of the vehicle).

In an example implementation, the one or more vehicles 104 may be equipped with the computer device 106 in the form of a mobile device in communication with a separate ELD, where the mobile device may function as an in-cab telematics device. In some instances, the mobile device may be a smart phone or tablet configured to receive and process signals and information. In some instances, the ELD may be in communication with the mobile device to allow the collected information to be displayed on the mobile device. To this end, the computer device 106 in the form of either the ELD or the mobile device may include a platooning module 107 to perform one or more functions of the present disclosure, including collecting and transmitting and receiving driver and/or vehicle data to and from a remote NCC 112 and/or configuring the vehicle to participate in a platooning convoy.

In some implementations, the computer device 106 may include a processor configured to execute one or more platooning modules 107 and establish communication with external devices, such as NCC 112, via a communication network (e.g., a terrestrial or satellite-based wireless network). The computer device 106 may also include a memory configured to store computer-readable code that may define all or part of the platooning module 107 and also to store data associated with the module, other components, and/or computer device 106. The computer device 106 may also include a user interface or display, a mobile application server, and a communications module (e.g., including the one or more transceivers, and one or more of terrestrial and Wi-Fi modems, one or more antennae, a GPS and/or satellite communications modem).

As an example only, each vehicle 104 may be in bi-directional communication via the computer device 106 with NCC 112 over at least one communication channel. In the example shown in FIG. 1, each vehicle 104 is in bi-directional communication with the NCC 112 over at least one of a satellite-based communication system 108 or a terrestrial-based system 110 (e.g., a wireless communication system using a communication protocol/technology such as, but not limited to, 5G or New Radio, GSM, CDMA, TDMA, WCDMA, EDGE, OFDM, GPRS, EV-DO, LTE, WiFi, Bluetooth), or, when the vehicle is stopped, via a wired connection 113 through the Internet. In some cases, data may be exchanged with the vehicles 104 using one or both of the satellite communication system 108 and the terrestrial-based communication system 110.

In an aspect, many different types of data are collected and transferred from the vehicles 104 to the NCC 112. Examples of such data include, but are not limited to, vehicle performance data, driver performance data, critical events, messaging and position data, location data, HOS data and many other types of data, which may be collectively referred to as vehicle data 109. All of the information that is communicated to and from the vehicles 104 may be processed via the NCC 112. The NCC 112 can be thought of as a data clearinghouse that receives all data that is transmitted to and received from the vehicles 104. In an aspect, NCC 112 may include one or more back-end servers. Thus, in some aspects, the collected information may periodically (e.g., every x minutes, where x is a whole number, or once a day, or upon availability of a wired or wireless connection) be transmitted from the computer device 106 to the NCC 112 for analysis and record keeping.

In some cases, the system 100 also may include a data center 116, which may be part of or in communication with NCC 112. The data center 116 illustrates one possible implementation of a central repository for all of the data received from each of the vehicles 104. As an example, as mentioned above many different types of data are transmitted from the computer devices 106 associated with each of the vehicles 104 to the NCC 112. In the case where data center 116 is in communication with NCC 112, the data may be transmitted via connection 111 to the data center 116. The connection 111 may comprise any wired or wireless dedicated connection, a broadband connection, or any other communication channel configured to transport the data. Moreover, in an aspect, data center 116 may include one or more back-end servers analyzing the data transmitted from the one or more computer devices 106. Additionally or alternatively, data may also be exchanged between the plurality of computer devices 106 using, for example, peer-to-peer (P2P) communication without the involvement of the NCC 112.

In an aspect, the data center 116 may include a data warehouse 114 for receiving the data from the computer device 106 relating to the vehicle 104. In an aspect, for example, data center 116 may include any number of application servers and data stores, where each may be associated with a separate fleet and/or driver management or performance data. In an aspect, each application server and data store may include a processor, memory including volatile and non-volatile memory, specially-programmed operational software, a communication bus, an input/output mechanism, and other operational systems. For example, an application server may be a services portal (SP) server that receives, for example, messaging and positioning (M/P) data from each of the vehicles 104. Another application server, for example only, may include one or more servers related to safety and compliance, such as a quick deployment center (QDC) server that receives, for example, critical event (CE) data from each of the vehicles 104. Further, for example, another application server may be vehicle and driver performance data related to HOS, fuel usage, and/or cost from each of the vehicles 104. It should be understood that the above list of example servers is for illustrative purposes only, and data center 116 may include additional and/or different application servers.

In some examples, the NCC 112 may include an image processing component 120 for processing geospatial image of a geographic area that includes a physical structure at a specified geographic coordinates. In some examples, the geofencing component 125 may generate a virtual geofence around the physical structure by leveraging the image processing component 120. Specifically, an image processing component 120 may receive geographic coordinate information associated with a street address of a physical structure and retrieve, from a database (e.g., data warehouse 114), a geospatial image of a geographic area including the physical structure based on the geographic coordinate information. Once the geospatial image of the geographic area has been retrieved, the image processing component 120 may apply computer vision function to the geospatial image to remove background noise (e.g., trees, streets, etc.) from the geospatial image and detect the boundary edges of the physical structure by analyzing the geospatial image absent the background noise.

Once the image processing component 120 identifies the boundary edges of the physical structure, the geofencing component 125 may extract a first boundary outline of the physical structure for virtual geofencing. Subsequently, the geofencing component 125 may calculate a second boundary outline offset outside of the first boundary line based on an offset value. The offset value may be variable or a fixed parameter. For example, the geofencing component 125 may determine a first set of latitude and longitude coordinates for a first plurality of geographic points of the first boundary outline, and identify a second set of latitude and longitude coordinates for a second plurality of geographic points by stepping out and away from each of the first set of latitude and longitude coordinates by a geographic distance defined by the offset value. Thus, the geofencing component 125 may determine the second boundary outline based on the second set of latitude and longitude coordinates.

In another example, the geofencing component 125 in collaboration with image processing component 120 may determine a first set of latitude and longitude coordinates for a first plurality of geographic points of the first boundary outline and convert the first set of latitude and longitude coordinates into a first set of pixel space coordinates for a first plurality of pixels of the first boundary outline. The geofencing component 125 and image processing component 120 may also identify a second set of pixel space coordinates for a second plurality of pixels by stepping out and away from each of the first set of pixel space coordinates by a pixel space distance defined by the offset value. Again, as noted above, the offset value may be variable (e.g., depending on location) or fixed offset value. The image processing component 120 may then convert the second set of pixel space coordinates into a second set of latitude and longitude coordinates for a second plurality of geographic points, and determine the second boundary outline based on the second set of latitude and longitude coordinates.

The second boundary outline may then be utilized by the geofencing component 125 as the basis for generating a virtual geofence around a physical structure (e.g., warehouse, a shipping physical structure, or a physical location that includes access for vehicles). Once the virtual geofence has been established, the location tracking component 130 may receive and analyze GPS information (e.g., GPS "pings") received from a plurality of devices (e.g., computer devices 106 configured to provide location information such as GPS tracking devices or mobile phones, etc.) located within the virtual geofence over a period of time in order to generate locations of interest information for different applications by tracking the density of the GPS clusters. For instance, within the established virtual geofence, the location tracking component 130 may track the location of passenger vehicles or delivery trucks over time to determine the precise location around the physical structure where the devices tend to remain stationary for extended periods of time. Such information would then allow location tracking component 130 to differentiate location of interests for each application (e.g., for logistics applications the location of delivery parking as opposed to customer parking areas etc.).

In some aspect, the NCC 112 may further communicate with a terminal device 125, which can be a user interface portal, a web-based interface, a personal computer (PC), a laptop, a personal data assistant (PDA), a smart phone, a dedicated terminal, a dumb terminal, or any other device over which a user 126, such as a manager or operator responsible for monitoring a fleet of vehicles 104, may communicate.

In an aspect, the NCC 112 and/or the data center 116 may include a processor 132 and a memory 134 to respectively execute and store instructions and data associated the operation of the data center 116, such as to operate the image processing component 120 and the location tracking component 130. Although shown as residing within the data center 116, the analysis engine may reside elsewhere, and may be implemented as a distributed system in which the processor 132 and the memory 134 may include one or more processor and memories, and may be located in different places, such as at NCC 112 and/or one or more servers associated with NCC 112 or data center.

Figure 2B:
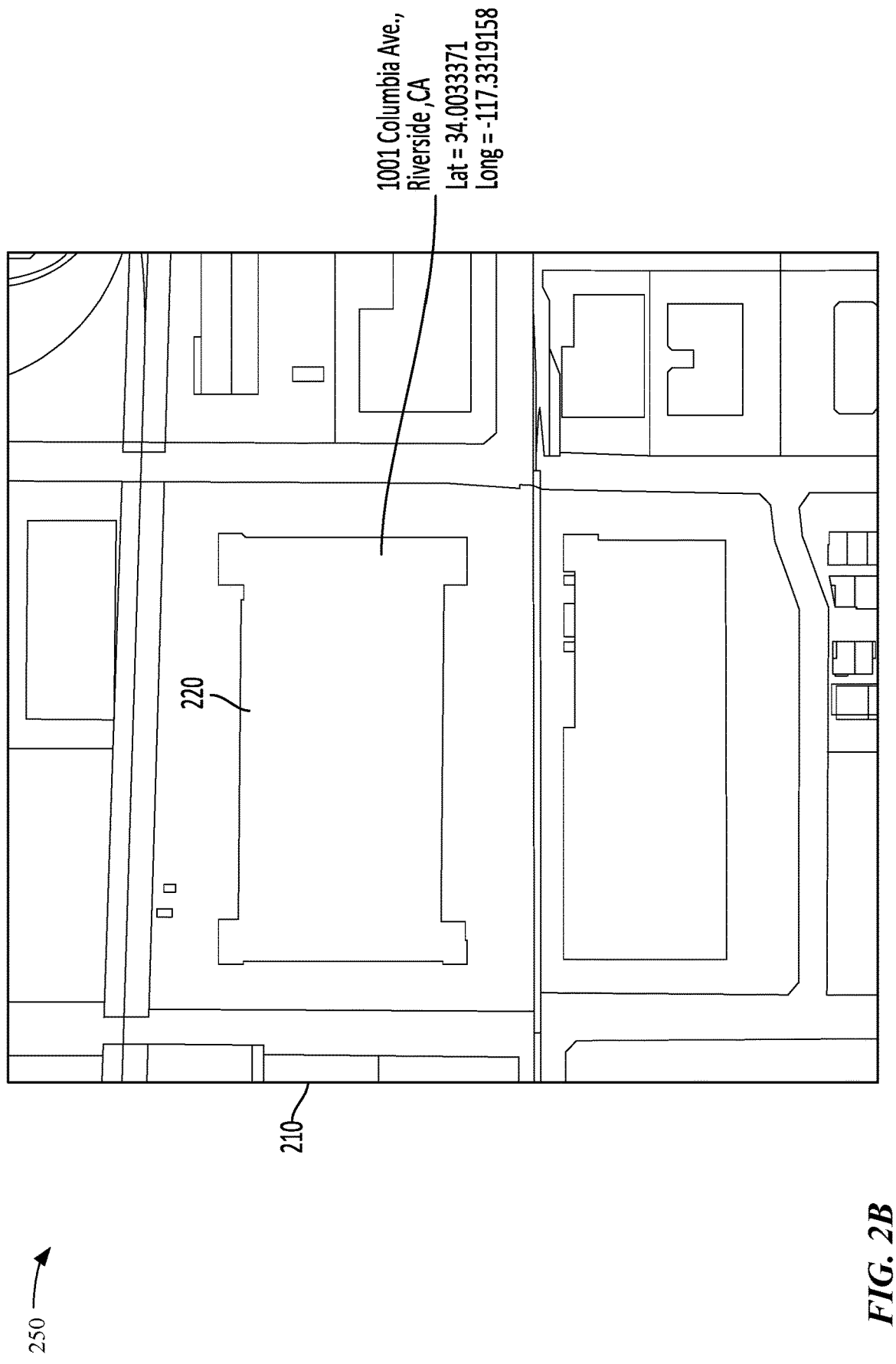

Referring to FIGS. 2A and 2B, an example one or more street address data 205 associated with one or more physical structures of facilities may be retrieved by the image processing component 120 (see FIG. 1) from a database (e.g., data warehouse 114). The one or more street address data 205 may be used to provide information for delivery or pick-ups, for instance, to one or more fleet of vehicles 104.

The raw text associated with the one or more street address data 205 may be parsed by the processor to yield the address data.

Based on the parsed address data of the one or more street address data 205, the image processing component 120 may obtain geographic coordinate information (e.g., latitude and longitude coordinates) for the one or more street address data 205. The image processing component 120 may also retrieve a geospatial image 210 corresponding to the geographic coordinate information to identify the physical structure of interest (e.g., building 220) whose coordinate information is associated with at least one street address.

Figure 3A:
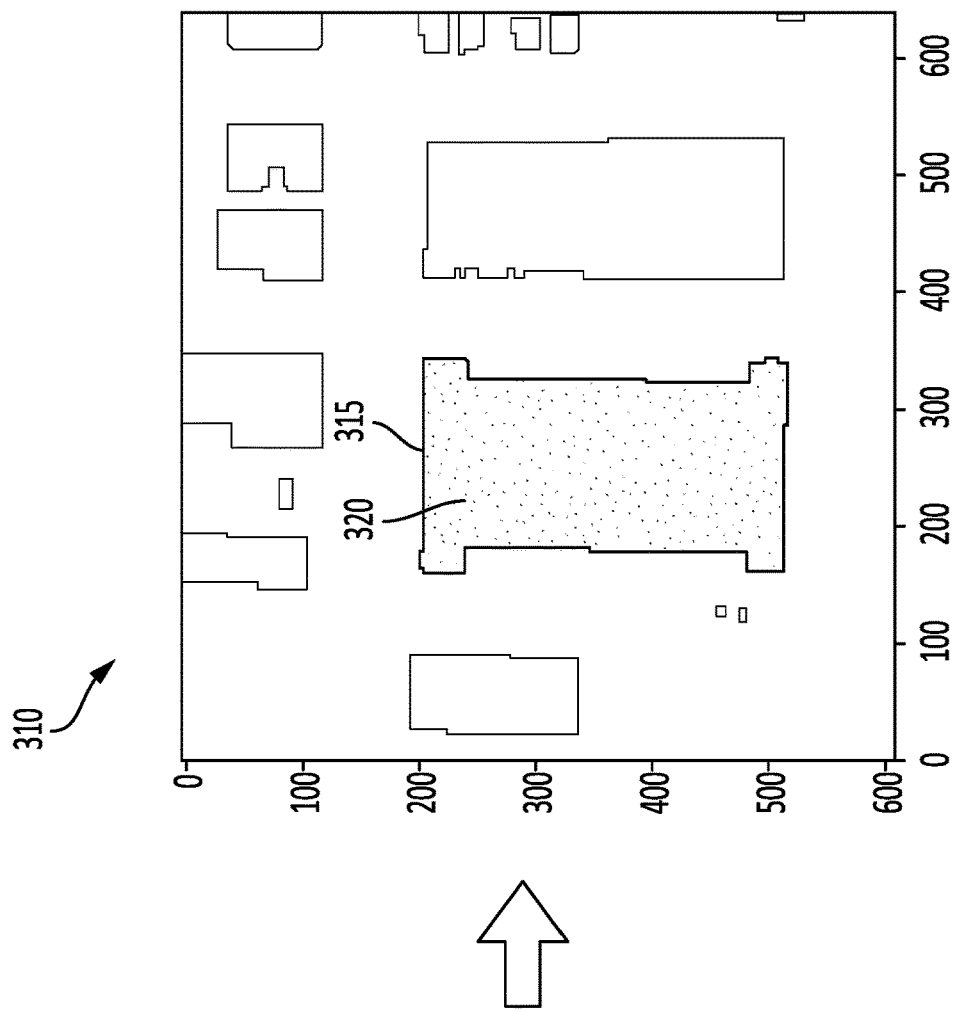
FIGS. 3A and 3B are examples image processing for facilitating identification of location of interest in accordance with aspects of the present disclosure.
Figure 3A:
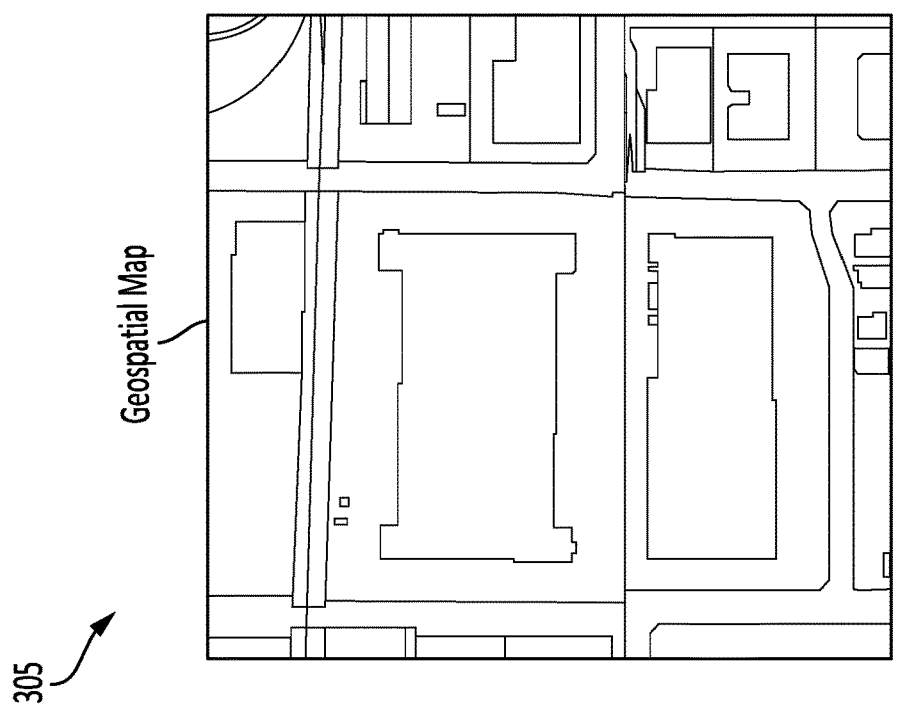

Turning next to FIG. 3A, once the geospatial image 210 corresponding to the geographic coordinate information is retrieved, the image processing component 120 (or image processor) may process the geospatial image to convert the geospatial image map 310 into an array 310 by removing background noise (e.g., using a background subtraction algorithm for image processing) and detecting the edges or boundaries 315 of the physical structure of interest 320. The edges or boundaries 315 of the physical structure of interest 320 may establish the initial or first boundary outline of the physical structure. In some examples, processing the geospatial image may include applying a computer vision function to the geospatial image to remove background noise from the geospatial image, and detecting boundary edges of the physical structure by analyzing the geospatial image absent the background noise. Thus, the image processing component 120 may determine the first boundary outline based on the boundary edges.

Figure 3B:
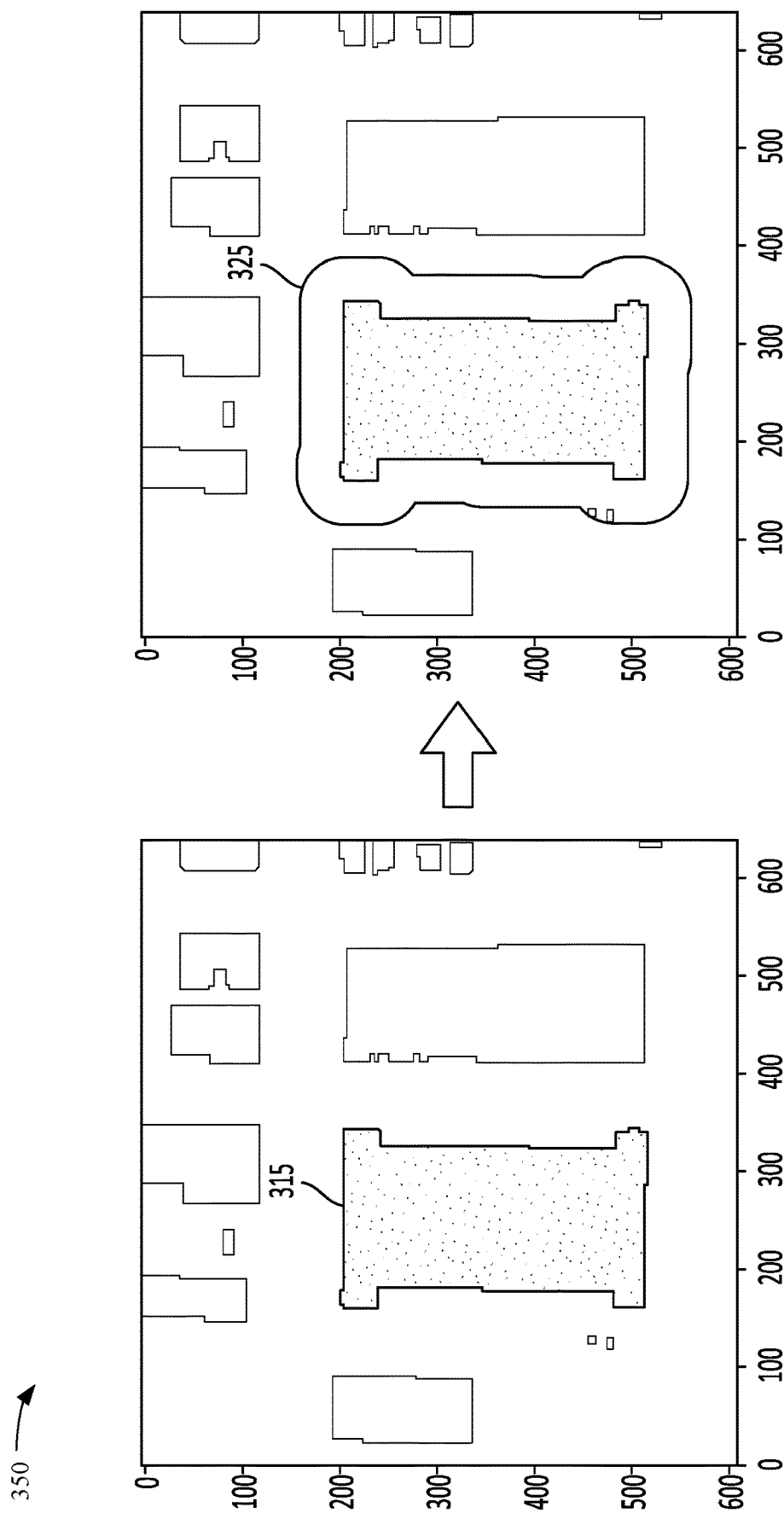
Figure 4A:
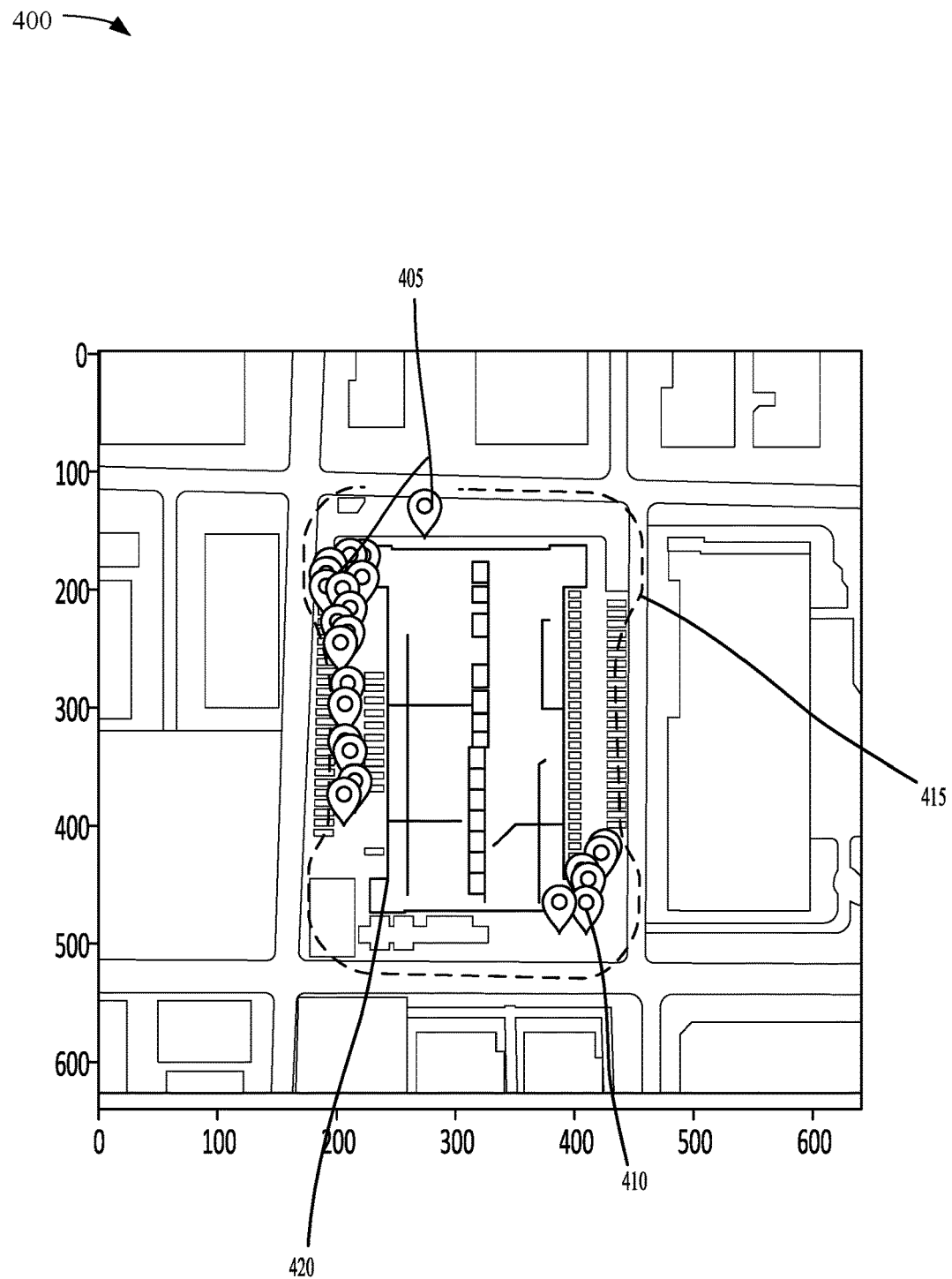
FIGS. 4A-4D are examples of the network computer processing GPS information received from a plurality of devices located within the virtual geofence over a period of time in order to generate locations of interest information for different applications.
Figure 4B:
Figure 4C:
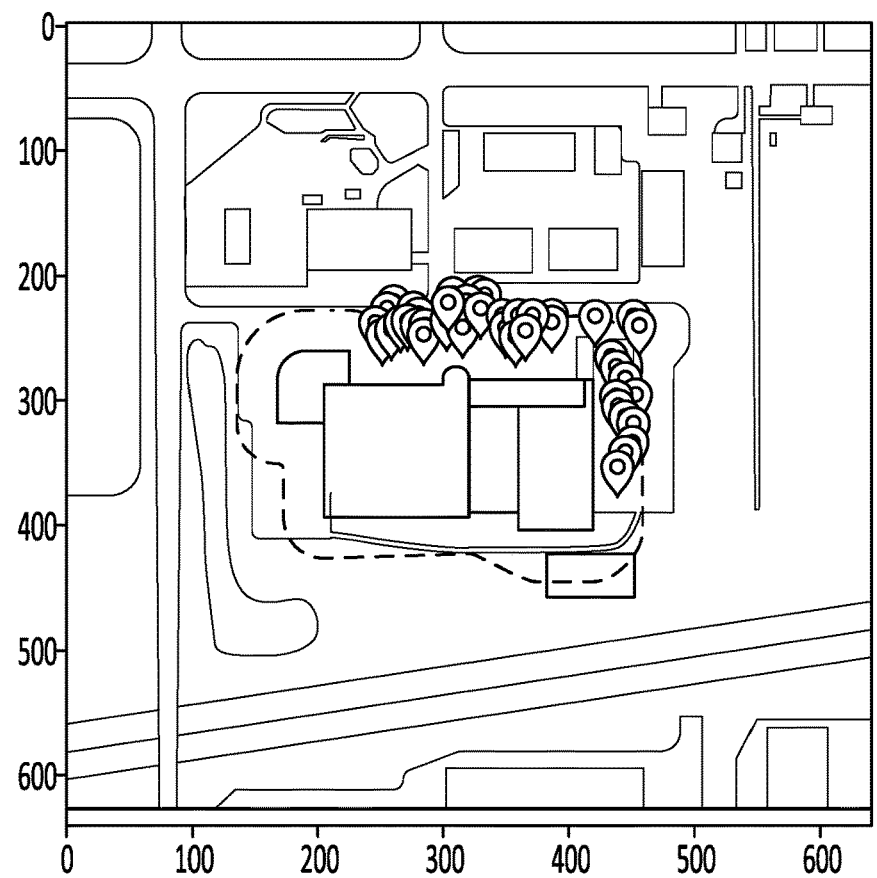
Figure 4D:
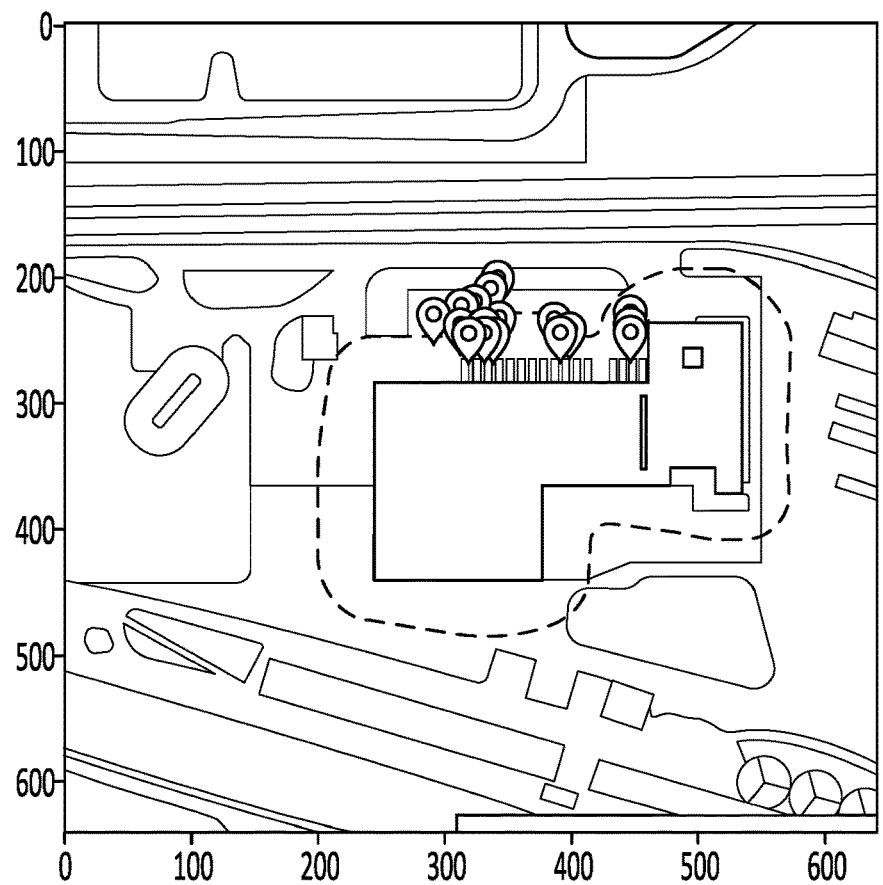

Turning next to FIG. 3B, the image processing component 120 may then calculating a second boundary outline offset 325 outside of the first boundary line 315 based on an offset value. In some examples, the offset value may be fixed or variable based on the physical structure. In particular, in calculating the offset value and the coordinates of the second boundary outline, the image processing component 120 may first determine a first set of latitude and longitude coordinates for a first plurality of geographic points of the first boundary outline, and then identify a second set of latitude and longitude coordinates for a second plurality of geographic points by stepping out and away from each of the first set of latitude and longitude coordinates by a geographic distance defined by the offset value. As such, the image processing component 120 may determine the second boundary outline based on the second set of latitude and longitude coordinates.

In other examples, the image processing component 120 may process the array image and calculate a pixel space coordinates between the first boundary and the second boundary. Specifically, the image processing component 120 may determine a first set of latitude and longitude coordinates for a first plurality of geographic points of the first boundary outline, and convert the first set of latitude and longitude coordinates into a first set of pixel space coordinates for a first plurality of pixels of the first boundary outline. The image processing component 120 may then identify a second set of pixel space coordinates for a second plurality of pixels by stepping out and away from each of the first set of pixel space coordinates by a pixel space distance defined by the offset value, and convert the second set of pixel space coordinates into a second set of latitude and longitude coordinates for a second plurality of geographic points. Finally, the image processing component 120 may determine the second boundary outline based on the second set of latitude and longitude coordinates.

In some examples, calculating the second boundary outline offset outside of the first boundary line may include applying a polygon offset function to the first boundary outline. The determination of the second boundary outline may be utilized by the geofencing component 125 for generating a virtual geofence around the physical structure corresponding to the second boundary outline 325, and storing, in a memory, geofence information 325 for the physical structure 320 based on the virtual geofence corresponding to the second boundary outline.

FIGS. 4A-4D are examples of an image 400, 425, 450, and 475 that is analyzed by the NCC 112, and more particularly the location tracking component 130, based in part on the virtual geofence information. In some aspects, the example of an image (e.g., 400) may be generated for the one or more physical structures 420. In some aspects, the NCC 112 may receive and process GPS information received from a plurality of devices located within the virtual geofence 415 over a period of time in order to generate locations of interest information 405 for different applications.

Specifically, as illustrated in FIGS. 4A-4D, the location tracking component 130 may receive GPS "pings" from one or more devices (e.g., computer device 106) capable of transmitting or broadcasting location information to the NCC 112. Over a period of time, the location tracking component 130 may monitor and identify locations of the cluster of GPS "pings" that are stationary at specified locations (e.g., measuring the density of GPS pings at a location over time), and thereby allow the location tracking component 130 to deduce that the computer device 106 that may be located within a vehicle that is parked. As such, over time, the location tracking component 130 may be able to develop historical data and identify one or more locations of interest within the virtual geofence 415 that are associated with the physical structure.

The information generated by the location tracking component 130 based on the virtual geofence 415 may be used in practical logistics applications including, for example, identifying a location of interest at the physical structure that is within the virtual geofence. The location of interest includes docking stations or parking spaces tailored to accommodate trucks or other vehicles and configuring a vehicle 104 to display the location of interest on a display screen located within the vehicle 104 (e.g., on the computer device 106). The system may also allow for generating a notice when a GPS data associated with a device (e.g., computer device 106) indicates that the device has either entered or exited the virtual geofence around the physical structure. The notice may include a message indicating that the device has arrived or departed the physical structure, and transmitting the notice to a remote computer identifying when the device has entered or exited the physical structure.

Additionally or alternatively, other practical applications may include detecting that a device (e.g., computer device 106), in route to the physical structure, is within a predetermined distance of the virtual geofence around the physical structure based on a GPS data associated with the device. The detection may trigger the computer device 106 or the NCC 112 to generate a notice indicating that the device will be arriving at the physical structure within a specified time period based on detecting that the device is within the predetermined distance of the virtual geofence. The computer device 106 or the NCC 112 may transmit the notice to a remote dispatcher prior to arrival at the physical structure.

Figure 5:
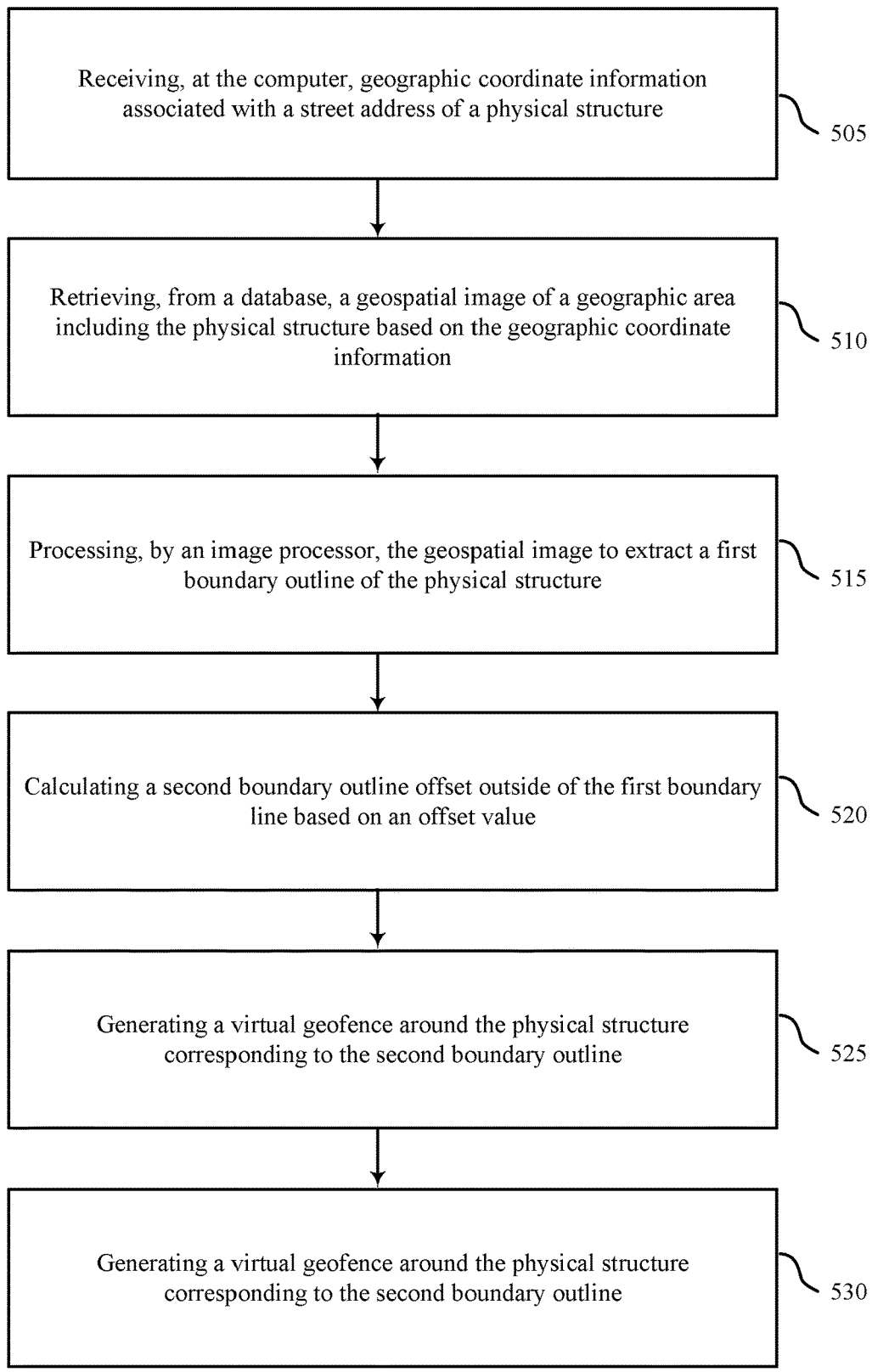
FIG. 5 is a flowchart of an example method for image processing for identification of location of interest in accordance with various aspects of the present disclosure.

Referring to FIG. 5, one example of a method 500 for image processing to identify locations of interest that may be performed by the NCC 112 discussed with reference to FIG. 1. In some examples, the method 500 may be performed by a processor (e.g., processor 132 with reference to FIGS. 1 and 6), such as by executing instructions stored in the memory (e.g., memory 134 with reference to FIGS. 1 and 6). It should be appreciated that the below identified operation of the method 500 is just one example of the method 500 to identify locations of interests. Indeed, the method 500 to identify the locations of interest may be modified in order that the steps are performed and/or interchangeable with other steps.

At block 505, the method 500 may include receiving, at the computer, geographic coordinate information associated with a street address of a physical structure. The geographic coordinates associated with the street address may include longitude and latitude coordinates of the physical structure. Additionally, the physical structure may be a warehouse, a shipping physical structure, or a physical location that includes access for trucks or large vehicles (e.g., semi-trucks, delivery trucks or vans etc.). Aspects of block 505 may be performed by the communications component 615 and the location tracking component 130 described with reference to FIGS. 1 and 6.

At block 510, the method 500 may include retrieving, from a database, a geospatial image of a geographic area including the physical structure based on the geographic coordinate information. Aspects of block 510 may be performed by the image processing component 120 described with reference to FIGS. 1 and 6.

At block 515, the method 500 may include processing, by an image processor, the geospatial image to extract a first boundary outline of the physical structure. In some examples, processing the geospatial image to extract the first boundary outline of the physical structure may comprise applying a computer vision function to the geospatial image to remove background noise from the geospatial image, and detecting boundary edges of the physical structure by analyzing the geospatial image absent the background noise. Thus, processing of the geospatial image may include determining the first boundary outline based on the boundary edges. Aspects of block 515 may be performed by the image processing component 120 described with reference to FIGS. 1 and 6.

At block 520, the method 500 may include calculating a second boundary outline offset outside of the first boundary line based on an offset value. In some examples, calculating the second boundary outline offset outside of the first boundary line may include determining a first set of latitude and longitude coordinates for a first plurality of geographic points of the first boundary outline. The method 500 may further include identifying a second set of latitude and longitude coordinates for a second plurality of geographic points by stepping out and away from each of the first set of latitude and longitude coordinates by a geographic distance defined by the offset value, and determining the second boundary outline based on the second set of latitude and longitude coordinates.

In other examples, calculating the second boundary outline offset outside of the first boundary line may include determining a first set of latitude and longitude coordinates for a first plurality of geographic points of the first boundary outline, and converting the first set of latitude and longitude coordinates into a first set of pixel space coordinates for a first plurality of pixels of the first boundary outline. The method may also include identifying a second set of pixel space coordinates for a second plurality of pixels by stepping out and away from each of the first set of pixel space coordinates by a pixel space distance defined by the offset value, and converting the second set of pixel space coordinates into a second set of latitude and longitude coordinates for a second plurality of geographic points. The method may further include determining the second boundary outline based on the second set of latitude and longitude coordinates.

In some aspects, calculating the second boundary outline offset outside of the first boundary line may include applying a polygon offset function to the first boundary outline. The offset value may be a value that is fixed or varies depending on a physical structure characteristic of the physical structure. Aspects of block 520 may be performed by the image processing component 120 and the geofencing component 125 described with reference to FIGS. 1 and 6.

At block 525, the method 500 may include generating a virtual geofence around the physical structure corresponding to the second boundary outline. Aspects of block 525 may be performed by the geofencing component 125 described with reference to FIGS. 1 and 6.

At block 530, the method 500 may include storing, in a memory, geofence information for the physical structure based on the virtual geofence corresponding to the second boundary outline. In some examples, once the virtual geofence is stored, the method 500 may include identifying a location of interest at the physical structure that is within the virtual geofence. The location of interest may include docking stations or parking spaces tailored to accommodate trucks, and configuring a vehicle to display the location of interest on a display screen located within the vehicle. The method may also include generating a notice when a GPS data associated with a device indicates that the device has either entered or exited the virtual geofence around the physical structure. The notice may include a message indicating that the device has arrived or departed the physical structure, and transmitting the notice to a remote computer identifying when the device has entered or exited the physical structure.

Additionally or alternatively, the virtual geofence information may be used to detect when a device, in route to the physical structure, is within a predetermined distance of the virtual geofence around the physical structure based on a GPS data associated with the device. The method may include generating a notice indicating that the device will be arriving at the physical structure based on detecting that the device is within the predetermined distance of the virtual geofence, and transmitting the notice to a remote dispatcher prior to arrival at the physical structure. Aspects of block 530 may be performed by the image processing component 120, the location tracking component 130, and the processor 132 described with reference to FIGS. 1 and 6.

Figure 6:
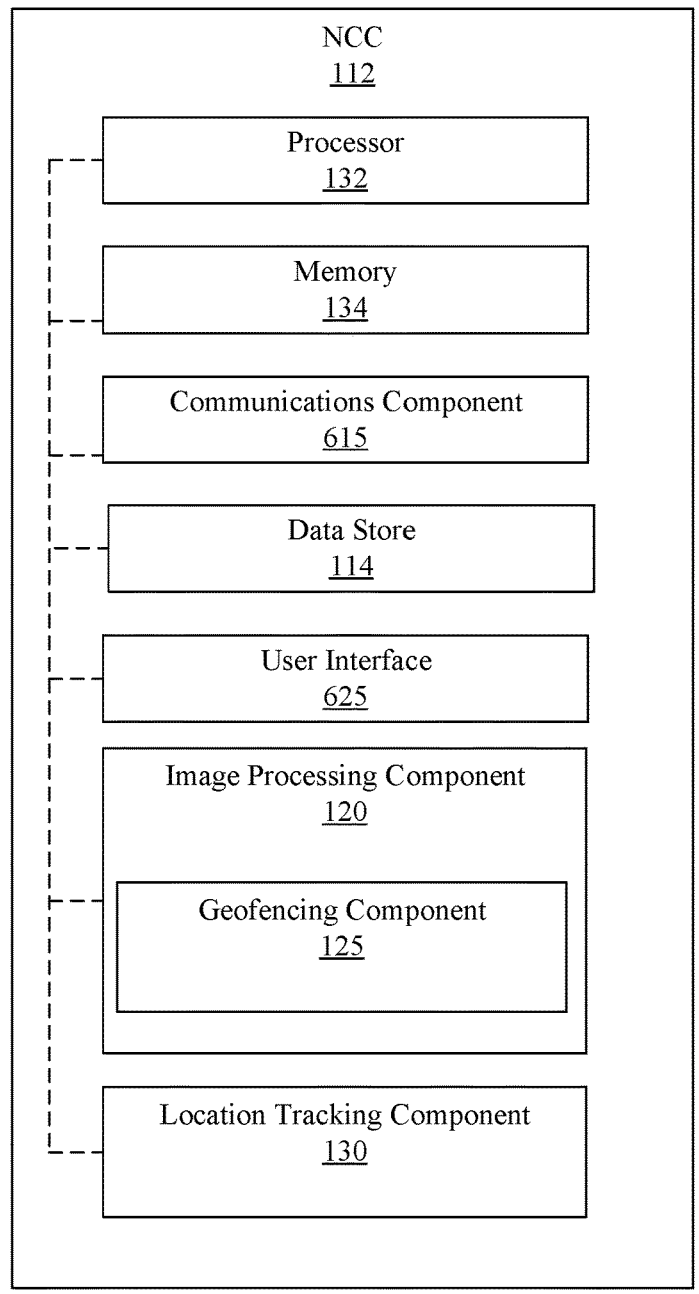
FIG. 6 is a block diagram of an example network computer device in accordance with the present disclosure.

Referring to FIG. 6, in an example that should not be construed as limiting, the NCC 112, may include additional components that operate in conjunction with the image processing component 120 and the location tracking component 130, and may be implemented in specially programmed computer readable instructions or code, firmware, hardware, or some combination thereof.

In an aspect, for example, features described herein with respect to the functions of the image processing component 120 and the location tracking component 130 may be implemented in or executed using one or any combination of processor 132, memory 134, communications module 615, and data store 114. For example, image processing component 120 and the location tracking component 130 may be defined or otherwise programmed as one or more processor modules of processor 132. Further, for example, image processing component 120 and the location tracking component 130 may be defined as a computer-readable medium (e.g., a non-transitory computer-readable medium) stored in memory 134 and/or data store 114 and executed by processor 132. Moreover, for example, inputs and outputs relating to operations of image processing component 120 and the location tracking component 130 may be provided or supported by communications module 615, which may provide a bus between the modules of NCC 112 or an interface for communication with external devices or modules.

Processor 132 can include a single or multiple set of processors or multi-core processors. Moreover, processor 132 can be implemented as an integrated processing system and/or a distributed processing system. Memory 134 may operate to allow storing and retrieval of data used herein and/or local versions of applications and/or software and/or instructions or code being executed by processor 132, such as to perform the respective functions of platooning management module 120 described herein. Memory 134 can include any type of memory usable by a computer, such as random access memory (RAM), read only memory (ROM), tapes, magnetic discs, optical discs, volatile memory, non-volatile memory, and any combination thereof.

Communications module 615 is operable to establish and maintain communications with one or more internal components/modules or external devices utilizing hardware, software, and services as described herein. Communications component 615 may carry communications between modules on NCC 112, as well as between user and external devices, such as devices located across a communications network and/or devices serially or locally connected to NCC 112. For example, communications component 615 may include one or more buses, and may further include transmit chain modules and receive chain modules associated with a transmitter and receiver, respectively, or a transceiver, operable for interfacing with external devices.

Additionally, data store 114, which can be any suitable combination of hardware and/or software, which provides for mass storage of information, databases, and programs employed in connection with aspects described herein. For example, data store 114 may be a data repository for applications not currently being executed by processor 132.

The NCC 112 may additionally include a user interface module 625 operable to receive inputs from a user, and further operable to generate outputs for presentation to the user. User interface module 625 may include one or more input devices, including but not limited to a keyboard, a number pad, a mouse, a touch-sensitive display, a navigation key, a function key, a microphone, a voice recognition module, any other mechanism capable of receiving an input from a user, or any combination thereof. Further, user interface module 625 may include one or more output devices, including but not limited to a display, a speaker, a haptic feedback mechanism, a printer, any other mechanism capable of presenting an output to a user, or any combination thereof.

The NCC 112 may also include an image processing component 120 for processing geospatial image of a geographic area that includes a physical structure at a specified geographic coordinates. In some examples, the geofencing component 125 may generate a virtual geofence around the physical structure by leveraging the image processing component 120. Specifically, an image processing component 120 may receive geographic coordinate information associated with a street address of a physical structure and retrieve, from a database (e.g., data warehouse 114), a geospatial image of a geographic area including the physical structure based on the geographic coordinate information. Once the geospatial image of the geographic area has been retrieved, the image processing component 120 may apply computer vision function to the geospatial image to remove background noise (e.g., trees, streets, etc.) from the geospatial image and detect the boundary edges of the physical structure by analyzing the geospatial image absent the background noise.

Once the image processing component 120 identifies the boundary edges of the physical structure, the geofencing component 125 may extract a first boundary outline of the physical structure for virtual geofencing. Subsequently, the geofencing component 125 may calculate a second boundary outline offset outside of the first boundary line based on an offset value. The offset value may be variable or a fixed parameter. For example, the geofencing component 125 may determine a first set of latitude and longitude coordinates for a first plurality of geographic points of the first boundary outline, and identify a second set of latitude and longitude coordinates for a second plurality of geographic points by stepping out and away from each of the first set of latitude and longitude coordinates by a geographic distance defined by the offset value. Thus, the geofencing component 125 may determine the second boundary outline based on the second set of latitude and longitude coordinates.

In another example, the geofencing component 125 in collaboration with image processing component 120 may determine a first set of latitude and longitude coordinates for a first plurality of geographic points of the first boundary outline and convert the first set of latitude and longitude coordinates into a first set of pixel space coordinates for a first plurality of pixels of the first boundary outline. The geofencing component 125 and image processing component 120 may also identify a second set of pixel space coordinates for a second plurality of pixels by stepping out and away from each of the first set of pixel space coordinates by a pixel space distance defined by the offset value. Again, as noted above, the offset value may be variable (e.g., depending on location) or fixed offset value. The image processing component 120 may then convert the second set of pixel space coordinates into a second set of latitude and longitude coordinates for a second plurality of geographic points, and determine the second boundary outline based on the second set of latitude and longitude coordinates.

The second boundary outline may then be utilized by the geofencing component 125 as the basis for generating a virtual geofence around a physical structure (e.g., warehouse, a shipping physical structure, or a physical location that includes access for vehicles). Once the virtual geofence has been established, the location tracking component 130 may receive and analyze GPS information (e.g., GPS "pings") received from a plurality of devices (e.g., computer devices 106 configured to provide location information such as GPS tracking devices or mobile phones, etc.) located within the virtual geofence over a period of time in order to generate locations of interest information for different applications by tracking the density of the GPS clusters. For instance, within the established virtual geofence, the location tracking component 130 may track the location of passenger vehicles or delivery trucks over time to determine the precise location around the physical structure where the devices tend to remain stationary for extended periods of time. Such information would then allow location tracking component 130 to differentiate location of interests for each application (e.g., for logistics applications the location of delivery parking as opposed to customer parking areas etc.).

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the FIGS. 1-6 which may illustrate various process flows.

As used in this description, the terms "module," "components," "database," "module," "system," and the like are intended to refer to a computer-related entity, either hardware, firmware, a combination of hardware and software, software, or software in execution. For example, a module may be, but is not limited to being, a process running on a processor, a processor, an object, an executable, a thread of execution, a program, and/or a computer. By way of illustration, both an application running on a computing device and the computing device may be a module. One or more modules may reside within a process and/or thread of execution, and a module may be localized on one computer and/or distributed between two or more computers. In addition, these modules may execute from various computer readable media having various data structures stored thereon. The modules may communicate by way of local and/or remote processes such as in accordance with a signal having one or more data packets (e.g., data from one module interacting with another module in a local system, distributed system, and/or across a network such as the Internet with other systems by way of the signal).

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc ("CD"), laser disc, optical disc, digital versatile disc ("DVD"), floppy disk and blue-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method for image processing to identify locations of interest, comprising:
   receiving, at a computer, geographic coordinate information associated with a street address of a physical structure;
   retrieving, from a database, a geospatial image of a geographic area including the physical structure based on the geographic coordinate information;
   processing, by an image processor, the geospatial image to extract a first boundary outline of the physical structure;
   calculating a second boundary outline offset outside of the first boundary outline based on an offset value;
   generating a virtual geofence around the physical structure corresponding to the second boundary outline;
   storing, in a memory, geofence information for the physical structure based on the virtual geofence corresponding to the second boundary outline;
   receiving and analyzing global positioning system (GPS) information from a plurality of devices within the virtual geofence, with each of the plurality of devices associated with a corresponding vehicle and the corresponding vehicle being used for delivery or pick-ups; and
   generating one or more locations of interest within the virtual geofence by tracking density of GPS clusters based on the GPS information.

2. The method of claim 1, wherein calculating the second boundary outline offset outside of the first boundary outline includes:
   determining a first set of latitude and longitude coordinates for a first plurality of geographic points of the first boundary outline;
   identifying a second set of latitude and longitude coordinates for a second plurality of geographic points by stepping out and away from each of the first set of latitude and longitude coordinates by a geographic distance defined by the offset value; and
   determining the second boundary outline based on the second set of latitude and longitude coordinates.

3. The method of claim 1, wherein calculating the second boundary outline offset outside of the first boundary outline includes:
   determining a first set of latitude and longitude coordinates for a first plurality of geographic points of the first boundary outline;
   converting the first set of latitude and longitude coordinates into a first set of pixel space coordinates for a first plurality of pixels of the first boundary outline;
   identifying a second set of pixel space coordinates for a second plurality of pixels by stepping out and away from each of the first set of pixel space coordinates by a pixel space distance defined by the offset value;
   converting the second set of pixel space coordinates into a second set of latitude and longitude coordinates for a second plurality of geographic points; and
   determining the second boundary outline based on the second set of latitude and longitude coordinates.

4. The method of claim 1, wherein calculating the second boundary outline offset outside of the first boundary outline includes applying a polygon offset function to the first boundary outline.

5. The method of claim 1, wherein the offset value is a value that varies depending on a physical structure characteristic of the physical structure.

6. The method of claim 1, wherein processing the geospatial image to extract the first boundary outline of the physical structure comprises:
   applying a computer vision function to the geospatial image to remove background noise from the geospatial image;
   detecting boundary edges of the physical structure by analyzing the geospatial image absent the background noise; and
   determining the first boundary outline based on the boundary edges.

7. The method of claim 1, further comprising:
   identifying a location of interest at the physical structure that is within the virtual geofence, wherein the location of interest includes docking stations or parking spaces tailored to accommodate trucks; and
   configuring a vehicle to display the location of interest on a display screen located within the vehicle.

8. The method of claim 1, further comprising:
   generating a notice when GPS data associated with a device indicates that the device has either entered or exited the virtual geofence around the physical structure, wherein the notice includes a message indicating that the device has arrived or departed the physical structure; and
   transmitting the notice to a remote computer identifying when the device has entered or exited the physical structure.

9. The method of claim 1, further comprising:
   detecting that a device, in route to the physical structure, is within a predetermined distance of the virtual geofence around the physical structure based on GPS data associated with the device;
   generating a notice indicating that the device will be arriving at the physical structure based on detecting that the device is within the predetermined distance of the virtual geofence; and
   transmitting the notice to a remote dispatcher prior to arrival at the physical structure.

10. The method of claim 1, wherein the geographic coordinates associated with the street address include longitude and latitude coordinates of the physical structure.

11. The method of claim 1, wherein the physical structure is a warehouse, a shipping physical structure, or a physical location that includes access for trucks.

12. An apparatus for image processing to identify locations of interest, comprising:
   a memory configured to store instructions; and
   a processor communicatively coupled with the memory, the processor configured to execute the instructions to:
   receive, at the processor, geographic coordinate information associated with a street address of a physical structure;
   retrieve, from a database, a geospatial image of a geographic area including the physical structure based on the geographic coordinate information;
   process, by an image processor, the geospatial image to extract a first boundary outline of the physical structure;
   calculate a second boundary outline offset outside of the first boundary outline based on an offset value;
   generating a virtual geofence around the physical structure corresponding to the second boundary outline;

store, in a memory, geofence information for the physical structure based on the virtual geofence corresponding to the second boundary outline;

receive and analyze global positioning system (GPS) information from a plurality of devices within the virtual geofence, with each of the plurality of devices associated with a corresponding vehicle and the corresponding vehicle being used for delivery or pick-ups; and generate one or more locations of interest within the virtual geofence by tracking density of GPS clusters based on the GPS information.

13. The apparatus of claim 12, wherein the instructions to calculate the second boundary outline offset outside of the first boundary outline further include instructions to be executed by the processor to:

determine a first set of latitude and longitude coordinates for a first plurality of geographic points of the first boundary outline;

identify a second set of latitude and longitude coordinates for a second plurality of geographic points by stepping out and away from each of the first set of latitude and longitude coordinates by a geographic distance defined by the offset value; and determine the second boundary outline based on the second set of latitude and longitude coordinates.

14. The apparatus of claim 12, wherein the instructions to calculate the second boundary outline offset outside of the first boundary outline further include instructions to be executed by the processor to:

determine a first set of latitude and longitude coordinates for a first plurality of geographic points of the first boundary outline;

convert the first set of latitude and longitude coordinates into a first set of pixel space coordinates for a first plurality of pixels of the first boundary outline;

identify a second set of pixel space coordinates for a second plurality of pixels by stepping out and away from each of the first set of pixel space coordinates by a pixel space distance defined by the offset value;

convert the second set of pixel space coordinates into a second set of latitude and longitude coordinates for a second plurality of geographic points; and determine the second boundary outline based on the second set of latitude and longitude coordinates.

15. The apparatus of claim 12, wherein calculating the second boundary outline offset outside of the first boundary outline includes applying a polygon offset function to the first boundary outline.

16. The apparatus of claim 12, wherein the offset value is a value that varies depending on a physical structure characteristic of the physical structure.

17. The apparatus of claim 12, wherein the instructions to process the geospatial image to extract the first boundary outline of the physical structure further include instructions to be executed by the processor to:

apply a computer vision function to the geospatial image to remove background noise from the geospatial image;

detect boundary edges of the physical structure by analyzing the geospatial image absent the background noise; and determine the first boundary outline based on the boundary edges.

18. The apparatus of claim 12, wherein the processor is further configured to execute the instructions to:

identify a location of interest at the physical structure that is within the virtual geofence, wherein the location of interest includes docking stations or parking spaces tailored to accommodate trucks; and configure a vehicle to display the location of interest on a display screen located within the vehicle.

19. The apparatus of claim 12, wherein the processor is further configured to execute the instructions to:

generate a notice when GPS data associated with a device indicates that the device has either entered or exited the virtual geofence around the physical structure, wherein the notice includes a message indicating that the device has arrived or departed the physical structure; and transmit the notice to a remote computer identifying when the device has entered or exited the physical structure.

20. The apparatus of claim 12, wherein the processor is further configured to execute the instructions to:

detect that a device, in route to the physical structure, is within a predetermined distance of the virtual geofence around the physical structure based on GPS data associated with the device;

generate a notice indicating that the device will be arriving at the physical structure based on detecting that the device is within the predetermined distance of the virtual geofence; and transmit the notice to a remote dispatcher prior to arrival at the physical structure.

21. The apparatus of claim 12, wherein the geographic coordinates associated with the street address include longitude and latitude coordinates of the physical structure.

22. The apparatus of claim 12, wherein the physical structure is a warehouse, a shipping physical structure, or a physical location that includes access for trucks.

23. A non-transitory computer readable medium storing instructions, executable by a processor of a computer for image processing to identify locations of interest, comprising instructions for:

receiving, at the computer, geographic coordinate information associated with a street address of a physical structure;

retrieving, from a database, a geospatial image of a geographic area including the physical structure based on the geographic coordinate information;

processing, by an image processor, the geospatial image to extract a first boundary outline of the physical structure;

calculating a second boundary outline offset outside of the first boundary outline based on an offset value;

generating a virtual geofence around the physical structure corresponding to the second boundary outline;

storing, in a memory, geofence information for the physical structure based on the virtual geofence corresponding to the second boundary outline;

receiving and analyzing global positioning system (GPS) information from a plurality of devices within the virtual geofence, with each of the plurality of devices associated with a corresponding vehicle and the corresponding vehicle being used for delivery or pick-ups; and generating one or more locations of interest within the virtual geofence by tracking density of GPS clusters based on the GPS information.

* * * * *